US010571654B2

United States Patent
Cheng et al.

(10) Patent No.: US 10,571,654 B2
(45) Date of Patent: Feb. 25, 2020

(54) FOUR-SURFACE NEAR-INFRARED WAFER-LEVEL LENS SYSTEMS

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 26 days.

(21) Appl. No.: 15/402,523

(22) Filed: Jan. 10, 2017

(65) Prior Publication Data

US 2018/0196227 A1    Jul. 12, 2018

(51) Int. Cl.
*G02B 13/18* (2006.01)
*G02B 9/04* (2006.01)
*G02B 13/00* (2006.01)

(52) U.S. Cl.
CPC ......... *G02B 13/003* (2013.01); *G02B 13/008* (2013.01); *G02B 13/0085* (2013.01)

(58) Field of Classification Search
CPC ...... G02B 3/00; G02B 3/0006; G02B 3/0037; G02B 9/00; G02B 9/04; G02B 13/00; G02B 13/001; G02B 13/0015; G02B 13/002; G02B 13/003; G02B 13/0055; G02B 13/006; G02B 13/008; G02B 13/0085; G02B 13/14; G02B 13/24
See application file for complete search history.

(56) References Cited

U.S. PATENT DOCUMENTS

| | | | | |
|---|---|---|---|---|
| 7,841,785 B2* | 11/2010 | Hirao | .................. | G02B 13/0025 359/740 |
| 7,995,293 B2* | 8/2011 | Kawasaki | ............ | G02B 13/003 359/715 |
| 8,000,037 B2 | 8/2011 | Hirao et al. | | |
| 8,279,535 B2* | 10/2012 | Hsu | ....................... | H04N 5/2257 359/717 |
| 8,477,437 B2* | 7/2013 | Hirao | ..................... | G02B 7/008 359/717 |

(Continued)

FOREIGN PATENT DOCUMENTS

WO    2008020899 A2    2/2008

OTHER PUBLICATIONS

Non-Final Rejection in U.S. Appl. No. 15/286,932 dated Mar. 30, 2018, 9 pages.

(Continued)

*Primary Examiner* — Thong Q Nguyen
(74) *Attorney, Agent, or Firm* — Lathrop GPM LLP

(57) ABSTRACT

A four-surface, near-infrared wafer-level lens system for imaging a scene onto an image plane includes (a) a first wafer-level lens having a first convex lens surface facing the scene and a second concave lens surface facing the image plane, and (b) a second wafer-level lens disposed between the first wafer-level lens and the image plane and including a third concave lens surface facing the scene and a fourth aspheric convex lens surface facing the image plane. The four-surface, near-infrared wafer-level lens system is further characterized by an image resolution corresponding to at least 60% contrast of 2 line pairs per millimeter in object plane across a scene portion having at least 10 millimeters extent in the object plane.

10 Claims, 10 Drawing Sheets

(56) References Cited

U.S. PATENT DOCUMENTS

| 9,897,778 B2* | 2/2018 | Yin .................... G02B 13/0005 |
| 2010/0220955 A1 | 9/2010 | Mitamura et al. |
| 2011/0013070 A1* | 1/2011 | Hirao .................... G02B 7/008 |
| | | 348/340 |
| 2011/0013293 A1* | 1/2011 | Kawasaki ............ G02B 13/003 |
| | | 359/793 |
| 2014/0192424 A1* | 7/2014 | Matsui ................ G02B 13/003 |
| | | 359/717 |
| 2017/0168200 A1* | 6/2017 | Corcoran ........... G02B 27/0075 |
| 2018/0100992 A1 | 4/2018 | Yin et al. |

OTHER PUBLICATIONS

Taiwan Patent Application No. 106133786, English translation of Office Action dated Dec. 29, 2017, 5 pages.
Taiwan Patent Application No. 106146592, English translation of Office Action dated Jun. 8, 2018, 2 pages.
U.S. Appl. No. 15/286,932, Non final Office Action dated Oct. 24, 2018, 15 pages.

* cited by examiner

FOUR-SURFACE NEAR-INFRARED WAFER-LEVEL LENS SYSTEMS

BACKGROUND

Iris recognition is an automated method of biometric identification that utilizes that the human iris is unique to each person in a manner similar to that of a fingerprint. Iris recognition is typically based on electronic image capture of a person's eye with subsequent analysis of the image to compare the iris with one or more known irises, for example by means of pattern recognition. Iris recognition is emerging as a viable technology for restricting system or location access to one or more authorized users. Recently, the consumer electronics industry has begun adopting iris recognition as an authorization tool in personal electronic devices such as smartphones. Although most such personal electronic devices are equipped with a camera, iris recognition imposes its own set of requirements on the camera system. A relatively narrow field of view must be imaged at high spatial resolution in order to resolve the features of the iris with sufficient detail to reliably determine if the iris is or is not that of an authorized user. Typically, this requires a lens module with precision molded glass lenses and more than six lens surfaces.

SUMMARY

Disclosed herein are lens systems suitable for employment in iris recognition applications. These lens systems are configured for operation in the near-infrared spectral range and use four lens surfaces to achieve the required resolution at least over a field of view the size of a human iris.

In an embodiment, a four-surface, near-infrared wafer-level lens system for imaging a scene onto an image plane includes (a) a first wafer-level lens having a first convex lens surface facing the scene and a second concave lens surface facing the image plane, and (b) a second wafer-level lens disposed between the first wafer-level lens and the image plane and including a third concave lens surface facing the scene and a fourth aspheric convex lens surface facing the image plane. In one implementation, the four-surface, near-infrared wafer-level lens system is further characterized by an image resolution, in the image plane, corresponding to at least 60% contrast of 2 line pairs per millimeter in object plane across a scene portion having at least 10 millimeters extent in the object plane. In another implementation, the effective focal length (EFFL) and an associated working distance (WD) of the four-surface, near-infrared wafer-level lens system fulfills WD/EFFL<75 at least for a 240 millimeter working distance. In yet another implementation, the first concave lens surface has radius of curvature R1 and the third concave lens surface has radius of curvature R3 such that absolute value of R1/R3 is greater than 0.43, and the effective focal length of the four-surface, near-infrared wafer-level lens system is such that the absolute value of R3/EFFL is less than 0.84.

DETAILED DESCRIPTION OF THE EMBODIMENTS

Figure 1A:
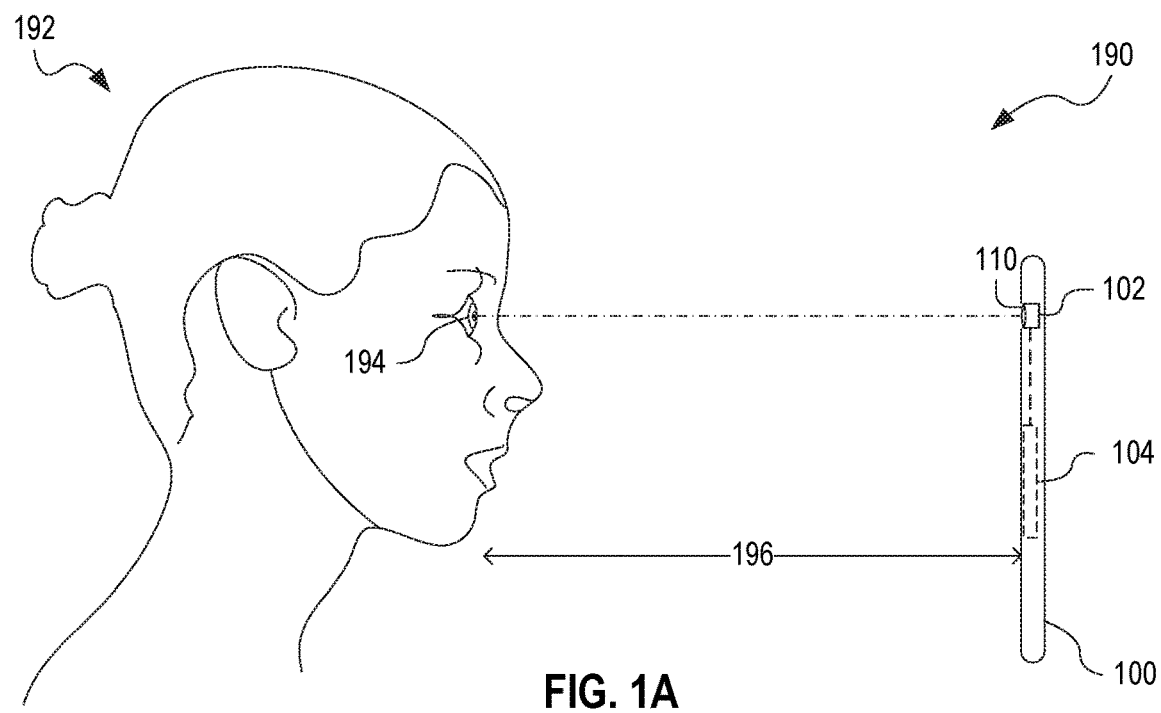
FIGS. 1A and 1B illustrate, according to an embodiment, a four-surface, near-infrared wafer-level lens system in an exemplary use scenario.
Figure 1B:
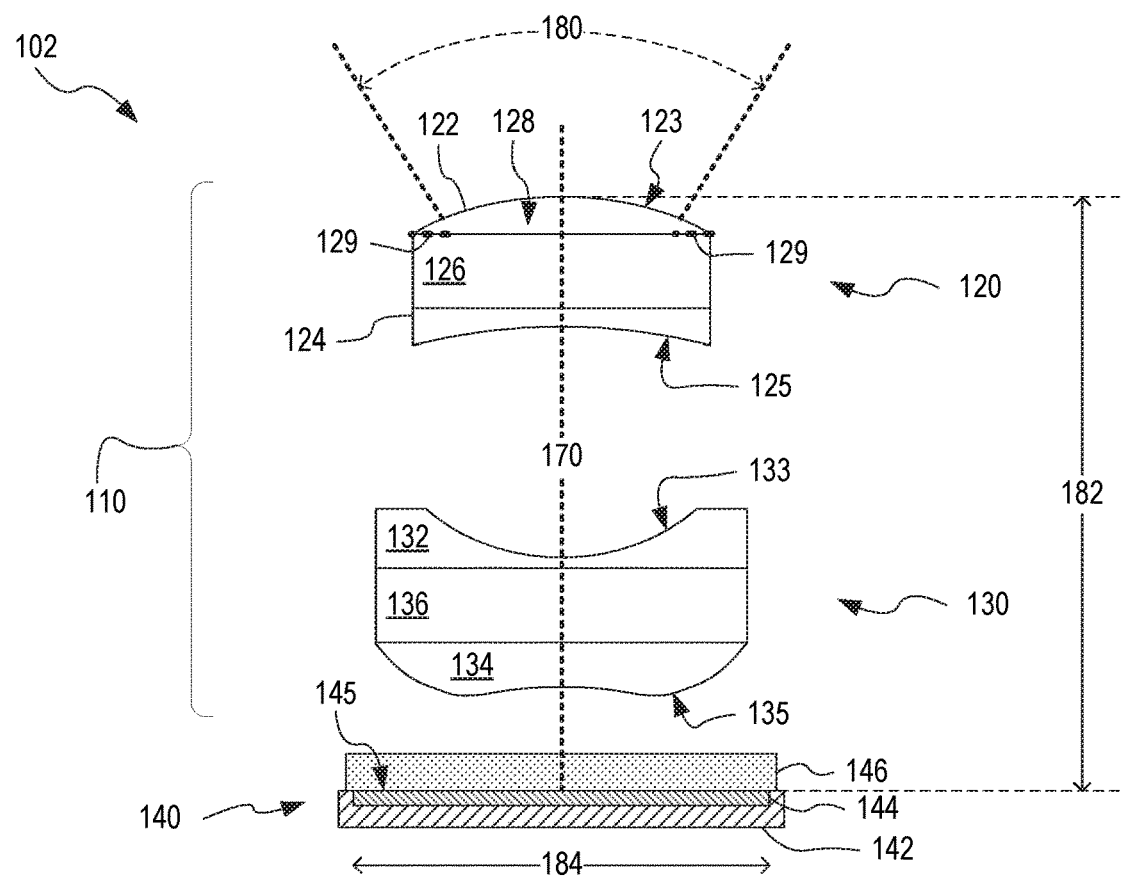

FIGS. 1A and 1B illustrate one exemplary four-surface, near-infrared wafer-level lens system 110 in an exemplary use scenario 190, wherein lens system 110 is used to perform iris recognition. FIG. 1A shows lens system 110 in use scenario 190, and FIG. 1B is a more detailed view of lens system 110 as implemented in a camera module 102. FIGS. 1A and 1B are best viewed together.

In use scenario 190, lens system 110 is incorporated in a personal electronic device 100 as part of camera module 102. Camera module 102 captures an image, formed by lens system 110, of an iris 194 of a subject 192. Device 100 may include an iris recognition module 104 that processes the image captured by camera module 102 to perform iris recognition. In one implementation, iris recognition module 104 determines if iris 194 matches a certain known iris so as to decide if subject 192 is authorized to use device 100. Iris recognition module 104 may apply a pattern recognition algorithm to the image captured by camera module 102 to evaluate patterns of iris 194, as imaged by lens system 110, and compare these patterns of iris 194 with a database of patterns of a user authorized to use device 100. If a satisfactory match is found, device 100 may unlock certain functions and, for example, provide access to data and applications onboard device 100.

Lens system 110 is configured to image a field of view (FOV) 180 that, at a practical working distance 196 between lens system 110 and iris 194, is sufficiently large to encompass the area of iris 194 without placing undue requirements on the accuracy with which subject 192 must align iris 194 with lens system 110 to ensure that iris 194 is within FOV 180. In one embodiment, lens system 110 is configured for operation at a working distance 196 in the range between 180 and 300 millimeters (mm), such as around 240 mm.

Lens system 110 includes a first wafer-level lens 120 and a second wafer-level lens 130 optically coupled in series along optical axis 170 to image a scene within FOV 180 onto an image plane. The image thus formed by lens system 110 is defined by an image circle of diameter 184. Herein, the "image circle" of a lens system refers to a collection or set of the farthest positions, with respect to the position of the optical axis (e.g., optical axis 170), that the cone of light transmitted by the lens system can reach on the image plane.

For axially symmetric lens systems such as those disclosed herein, this collection or set describes a circle on the image plane. The image circle is defined herein as the circle that coincides with full width at half maximum of the cone at the image plane.

First wafer-level lens 120 forms a convex lens surface 123 facing the scene (e.g., iris 194), and a concave lens surface 125 facing the image plane (e.g., facing away from iris 194). Second wafer-level lens 130 forms a concave lens surface 133 facing the scene, and an aspheric lens surface 135 facing the image plane. One or more of lens surfaces 123, 125, and 133 may be aspheric. Lens system 110 is capable of forming an image with the spatial resolution required for iris recognition using only these four lens surfaces. In contrast, conventional lens systems used for iris recognition generally include more than six lens surfaces. Herein, a "lens surface" refers to a curved surface. In one embodiment, lens system 110 includes only these four lens surfaces. Lens system 110 may include one or more very slightly curved surfaces in addition to those shown in FIG. 1B, without departing from the scope hereof. In one such example, a surface shown in FIG. 1B as being planar has a slight curvature.

Wafer-level lens 120 forms a stop aperture 128 at the surface of substrate 126 facing the scene. For this purpose, wafer-level lens 120 may include an opaque coating 129 on the surface of substrate 126 facing the scene, wherein this opaque coating has an opening that defines stop aperture 128.

In operation, lens surface 123 collects rays into lens system 110, and lens surface 125 adjusts the propagation direction of rays collected by lens surface 123 after passing through stop aperture 128. The placement of stop aperture 128 within lens system 110, as opposed to between lens system 110 and the scene, helps preserve the symmetry of each ray bundle respectively associated with a field location. Lens surfaces 133 and 135 bend the ray onto the image plane of lens system 110 and also balance distortion of lens system 110 to improve the spatial resolution of images formed by lens system 110.

The properties of lens system 110 are optimized for operation in the near-infrared spectral range, at least within the range from 825 to 875 nm, for example within the range from 800 to 900 nanometers (nm). Although not shown in FIGS. 1A and 1B, device 100 may include a near-infrared light source, such as a near-infrared light-emitting diode (LED), that illuminates iris 194 to enable imaging of iris 194 by lens system 110.

In certain embodiments, R1/R3 is more negative than −0.43 and R3/EFFL is less negative than −0.84, wherein R1 is the radius of curvature of lens surface 123 and R3 is the radius of curvature of lens surface 133. These relations help minimize optical aberrations such as distortion. Herein, a radius of curvature is positive if the center of curvature is downstream, along optical axis 170, from the lens surface in question (i.e., further from the scene than the lens surface in question), whereas a center of curvature upstream from the lens surface in question corresponds to the lens surface having a negative radius of curvature. For example, the radius of curvature R1 of lens surface 123 is positive, while the radius of curvature R3 of lens surface 133 is negative.

Wafer-level lens 120 includes a substantially planar substrate 126, a lens element 122 on the surface of substrate 126 facing the scene, and a lens element 124 on the surface of substrate 126 facing the image plane. Lens element 122 forms lens surface 123, and lens element 124 forms lens surface 125. Wafer-level lens 130 includes a substantially planar substrate 136, a lens element 132 on the surface of substrate 136 facing the scene, and a lens element 134 on the surface of substrate 136 facing the image plane. Lens element 132 forms lens surface 133, and lens element 134 forms lens surface 135.

Each of wafer-level lenses 120 and 130 is formed via wafer-level lens molding technology and may therefore be manufactured at low cost and in high volume. The wafer-level manufacturing method benefits from relatively compact transverse dimensions of wafer-level lenses 120 and 130 to produce a very large number of wafer-level lenses per wafer. This gain in production yield is greater than the size-attributable gain achievable when using casting or machining to manufacture lenses.

In an embodiment, lens system 110 includes no other lenses that wafer-level lenses 120 and 130 and includes no other lens surfaces than lens surfaces 123, 125, 133, and 135, which further simplifies the manufacturing process as compared to conventional lens systems having more lens elements and lens surfaces/interfaces.

Wafer-level lenses 120 and 130 benefit from wafer-level mass-production methods to enable lower manufacturing cost than those associated with cast lenses, such as molded glass lenses, or machined lenses. Furthermore, wafer-level production of wafer-level lens 120 allows for lens elements 122 and 124 to be made from a different material than that of substrate 126, as well as for lens elements 122 and 124 to be made from two different materials, respectively. Likewise, wafer-level production of wafer-level lens 130 allows for lens elements 132 and 134 to be made from a different material than that of substrate 136, as well as for lens elements 132 and 134 to be made from two different materials, respectively. Such additional freedom of material choices, as compared to a cast or machined lens, provides additional flexibility to achieve desired performance characteristics of wafer-level lenses 120 and 130. In an embodiment, (a) lens element 122 is made of a different material than the material of lens element 124, and/or (b) lens element 132 is made from a different material than the material of lens element 134.

In one embodiment, the Abbe number of lens element 122 is less than the Abbe number of lens element 124. In another embodiment, the Abbe number of lens element 132 is less than the Abbe number of lens element 134, and optionally also less than the Abbe number of lens elements 122 and 124. The lower Abbe number of lens element 132 serves to correct chromatic aberrations such as lateral color.

Each of lens elements 122, 124, 132, and 134 is integrally formed, that is, formed from one material and in one piece. Hence, each of lens elements 122, 124, 132, and 134 is composed of a single material throughout. However, one or more of lens elements 122, 124, 132, and 134 may include one or more surface coatings, such as an antireflective coating, without departing from the scope hereof.

Camera module 102 include lens system 110 and an image sensor 140. Image sensor 140 includes (a) an active layer 142 with a pixel array 144 and (b) a cover glass 146 that protects active layer 142. Image sensor 140 is positioned such that the image plane of lens system 110 coincides with pixel array 144, for example with the light-receiving surface 145 of active layer 142. Lens system 110 is configured for cooperation with cover glass 146 to form an image on pixel array 144.

Image sensor 140 is, for example, a complementary-metal-oxide semiconductor (CMOS) image sensor, a charged coupled device (CCD), or another focal plane array.

Lens system 110 has a total track length (TTL) 182. TTL 182 is the distance from the image plane of lens system 110 to the surface of lens system 110 closest to the scene and furthest away from the image plane, i.e., lens surface 123. In FIG. 1, the image plane of lens system 110 coincides with light-receiving surface 145 of active layer 142 of image sensor 140. In an embodiment, TTL 182 is less than 4 mm, for example in the range between 3.5 and 3.8 mm, and the image circle has diameter 184 in the range between 2.4 and 2.6 mm.

Since wafer-level lenses 120 and 130 are manufactured at the wafer level, each of wafer-level lenses 120 and 130 generally have rectangular (for example square) cross section in dimensions orthogonal to optical axis 170. However, without departing from the scope hereof, the singulation of one or both of wafer-level lenses 120 and 130 from the wafer level may include non-standard dicing methods, and/or post-dicing modification may be performed, to produce the wafer-level lens with a non-rectangular cross section. Lens elements 122, 124, 132, and 134 may be molded onto the respective substrates to produce lens surfaces 123, 135, 133, and 135 of circular perimeter. The dicing to singulate wafer-level lenses 120 and 130 from the wafer level may be performed outside the perimeters of individual wafer-level lenses 120 and 130 such that each of lens surfaces 123, 135, 133, and 135 has a circular perimeter after dicing. Alternatively, one or more lens surfaces 123, 135, 133, and 135 may be truncated during dicing to produce a lens surface with a cross section of rectangular or truncated circular shape.

Figure 2A:
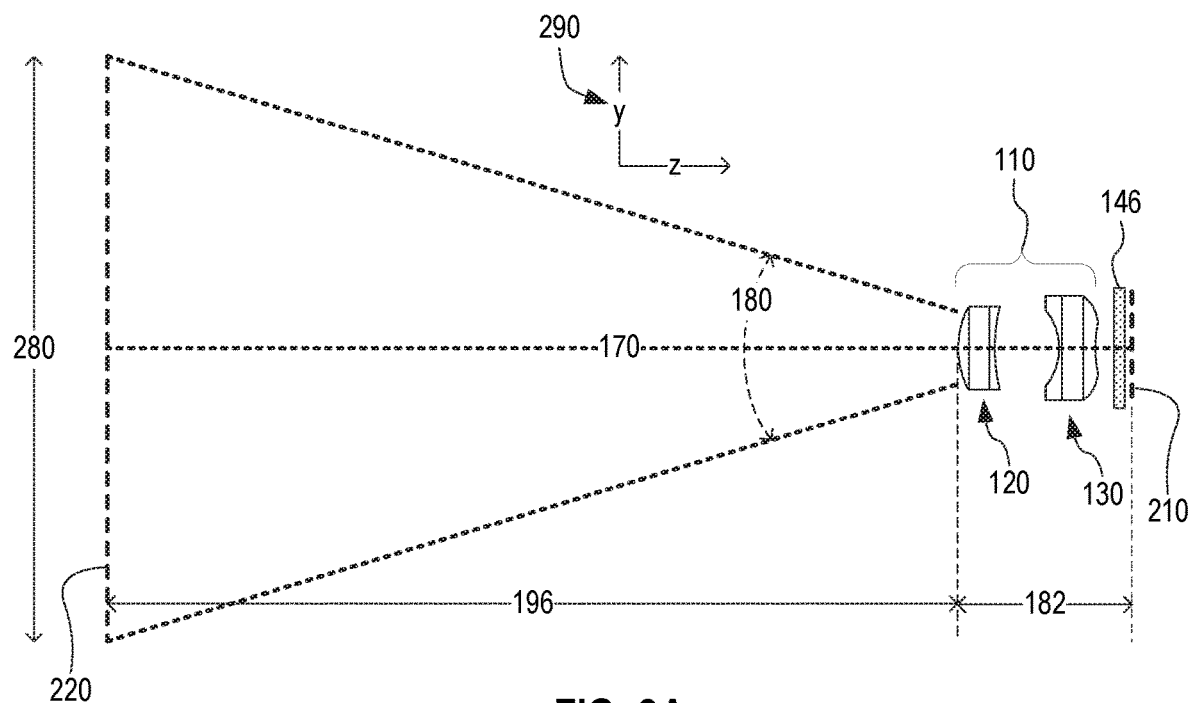
FIGS. 2A and 2B illustrate exemplary geometrical aspects of the use of the lens system of FIG. 1 as applied to iris recognition.
Figure 2B:
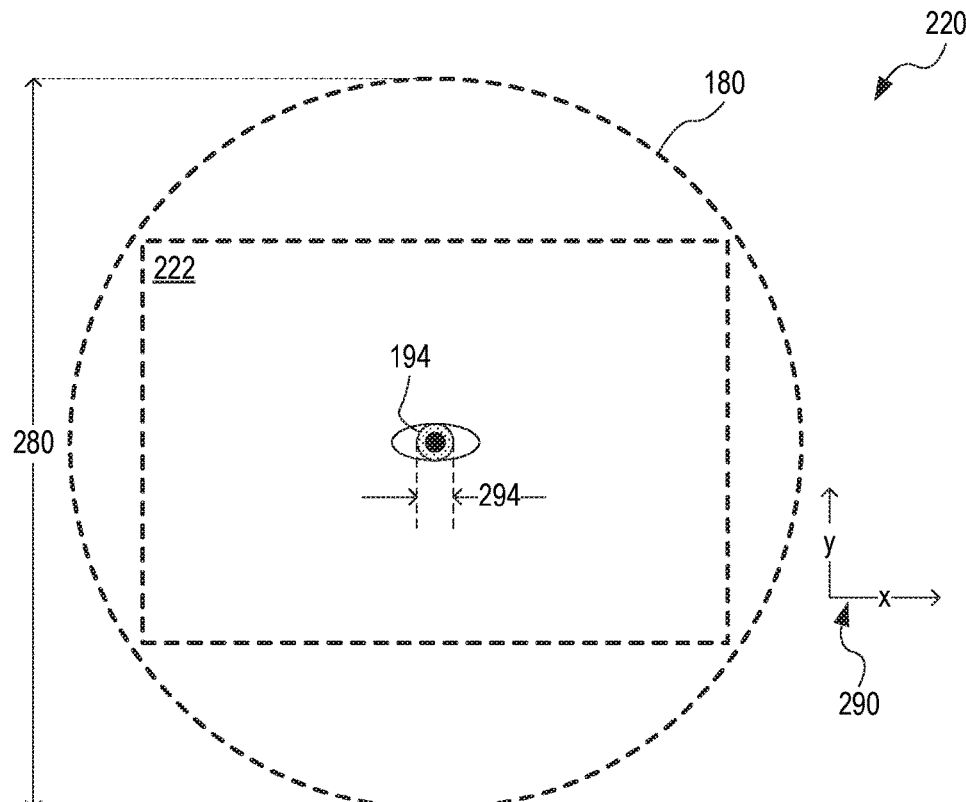

FIGS. 2A and 2B illustrate exemplary geometrical aspects of the use of lens system 110 as applied to iris recognition. FIG. 2A shows imaging by lens system 110 of an object plane onto an image plane. FIG. 2A is a cross sectional view with the cross section being taken in a y-z plane according to a coordinate system 290, wherein the z-axis is parallel to optical axis 170. FIG. 2B shows the object plane with exemplary placement of iris 194 therein. The object plane is parallel to the x-y plane of coordinate system 290. FIGS. 2A and 2B are best viewed together.

Lens system 110 is configured to form an image at an image plane 210 located at TTL 182 from the position of lens system 110 (lens surface 123) closest to the scene. In operation, when lens system 110 is implemented in camera module 102, image plane 210 coincides with pixel array 144. The position of image plane 210 is related to the position of a corresponding object plane 220 via the lens equation adapted for thick lenses: $1/s_o + 1/s_i = 1/s_{EFFL}$, wherein $s_o$ is the distance from object plane 220 to the first principal plane and $s_i$ is the distance from the second principal plane to image plane 210. The properties of wafer-level lenses 120 and 130 together with the above lens equation thus define working distance 196 from lens system 110 to object plane 220. Lens system 110 forms an optimally focused image of iris 194 when iris 194 is placed at object plane 220, at least in the case where iris 194 is located on optical axis 170.

FOV 180 may be characterized by a FOV angle in the range from 60 to 75 degrees. Herein "FOV angles" are measured from the extreme on one side of the optical axis to the corresponding extreme on the opposite side of the optical axis. However, it is understood that lens system 110 may be coupled with an embodiment of image sensor 140 having a rectangular pixel array 144. This rectangular pixel array 144 may limit the operable FOV of lens system 110 to less than FOV 180, for example as indicated in FIG. 2B by operable FOV 222. For example, pixel array 144 may reduce the operable FOV of lens system 110 to (a) an operable FOV 222 of 60 to 65 degrees in the dimension parallel to a longer side of pixel array 144 (horizontal in FIG. 2B) and (b) an operable FOV 222 of 30 to 40 degrees in the dimension parallel to a shorter side of pixel array 144 (vertical in FIG. 2B).

At working distance 196, the extent 280 of FOV 180, transverse to optical axis 170, may be a factor of 10 to 15 greater than the diameter 294 of iris 194. The diameter of a human iris is usually in the range from 10 to 13 mm. Extent 280 may be in the range from 100 to 200 mm, for example in the range from 140 to 160 mm. Lens system 110 is configured to image iris 194 with sufficient spatial resolution to enable iris recognition analysis. The effective focal length (EFFL) of lens system 110 is such that the ratio of working distance 196 to EFFL is less than 66. This limit ensures that FOV 180 is small enough to image iris 194 with the spatial resolution required for iris recognition.

Figure 3A:
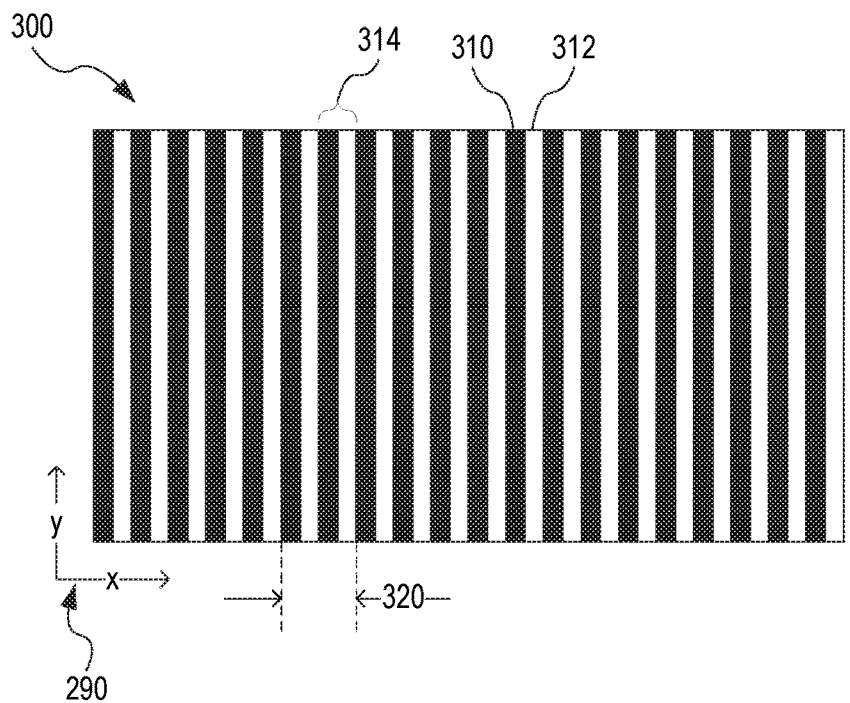
FIGS. 3A-C illustrate exemplary measurements of the spatial resolution of images formed by the lens system of FIG. 1.
Figure 3B:
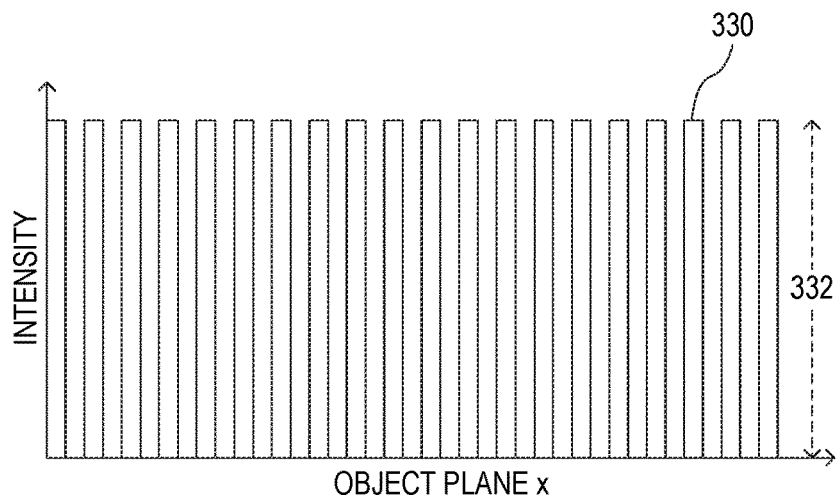
Figure 3C:
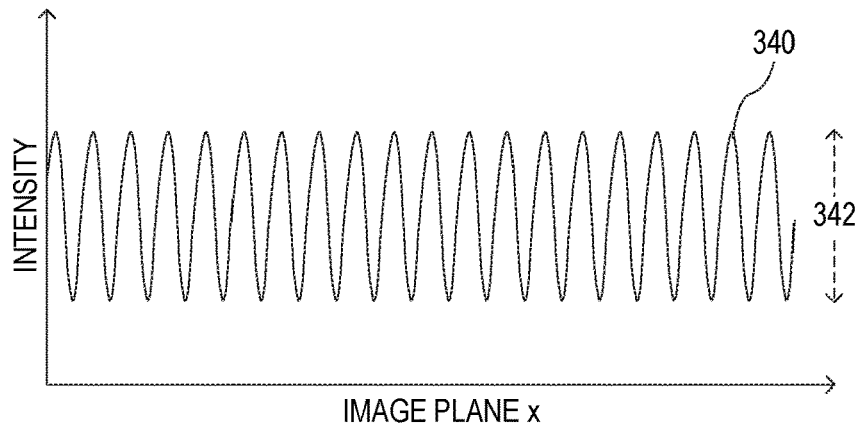

FIGS. 3A-C illustrate exemplary measurements of the spatial resolution of images formed by lens system 110. FIG. 3A shows a resolution test chart 300 with a plurality of line pairs 314. FIG. 3B shows the inherent contrast of resolution test chart 300. FIG. 3C shows the contrast of an image of resolution test chart 300 formed by lens system 110. FIGS. 3A-C are best viewed together.

Each line pair includes a dark line 310 and a white line 312. Resolution test chart has two line pairs 314 per distance 320. In a measurement of the spatial resolution of lens system 110, resolution test chart 300 is placed in object plane 220 with lines 312 and 310 parallel to the y-axis of coordinate system 290. The intensity profile of resolution test chart along the x-axis of coordinate system 290 is indicated by curve 330 that shows an inherent difference 332 between peaks and valleys of curve 330. In one example, valleys of curve 330 have zero intensity. When imaged by lens system 110 onto image plane 210, the resulting image is characterized by the intensity profile shown in FIG. 3C. Curve 340 indicates the intensity profile of the image of resolution test chart 300 along the x-axis of coordinate system 290 in image plane 210. Due to the finite spatial resolution, the difference 342 between peaks and valleys of curve 340 is reduced as compared to difference 332, at least when normalized to the maximum brightness of respective curves 330 and 340. Difference 342 corresponds to an image contrast calculated as $C = (I_{max} - I_{min})/(I_{max} + I_{min})$, wherein $I_{max}$ is the intensity value of the peaks of curve 340 and $I_{min}$ is the intensity value of valleys of curve 340.

At least within a finite range around optical axis 170, lens system 110 is capable of producing an image contrast C, associated with curve 340, of at least 60% for two line pairs per millimeter (i.e., for distance 320=1 mm) and an inherent contrast C, associated with curve 330, of 100%. A contrast of at least 60% for two line pairs per millimeter (in the object plane) is the requirement for biometric enrollment, verification and identification systems defined by the ISO/IEC 19794-6 standard. In one embodiment, lens system 110 is capable of producing this contrast of at least 60% for two line pairs per millimeter at least within a range of diameter 294 centered on optical axis 170. In this embodiment, lens system 110 is capable of imaging the full extent of iris 194, when placed in object plane 220 and centered on optical axis 170, onto image plane 210 with a spatial resolution characterized by at least 60% contrast for two line pairs per millimeter. Without departing from the scope hereof, this 60% contrast may be determined as the modulus of the optical transfer function.

In an embodiment, the magnification of lens system 110 is such that two line pairs per millimeter in object plane 220 corresponds to between 120 and 140 line pairs per millimeter in image plane 210, for example around 127 line pairs per millimeter in image plane 210.

Figure 4:
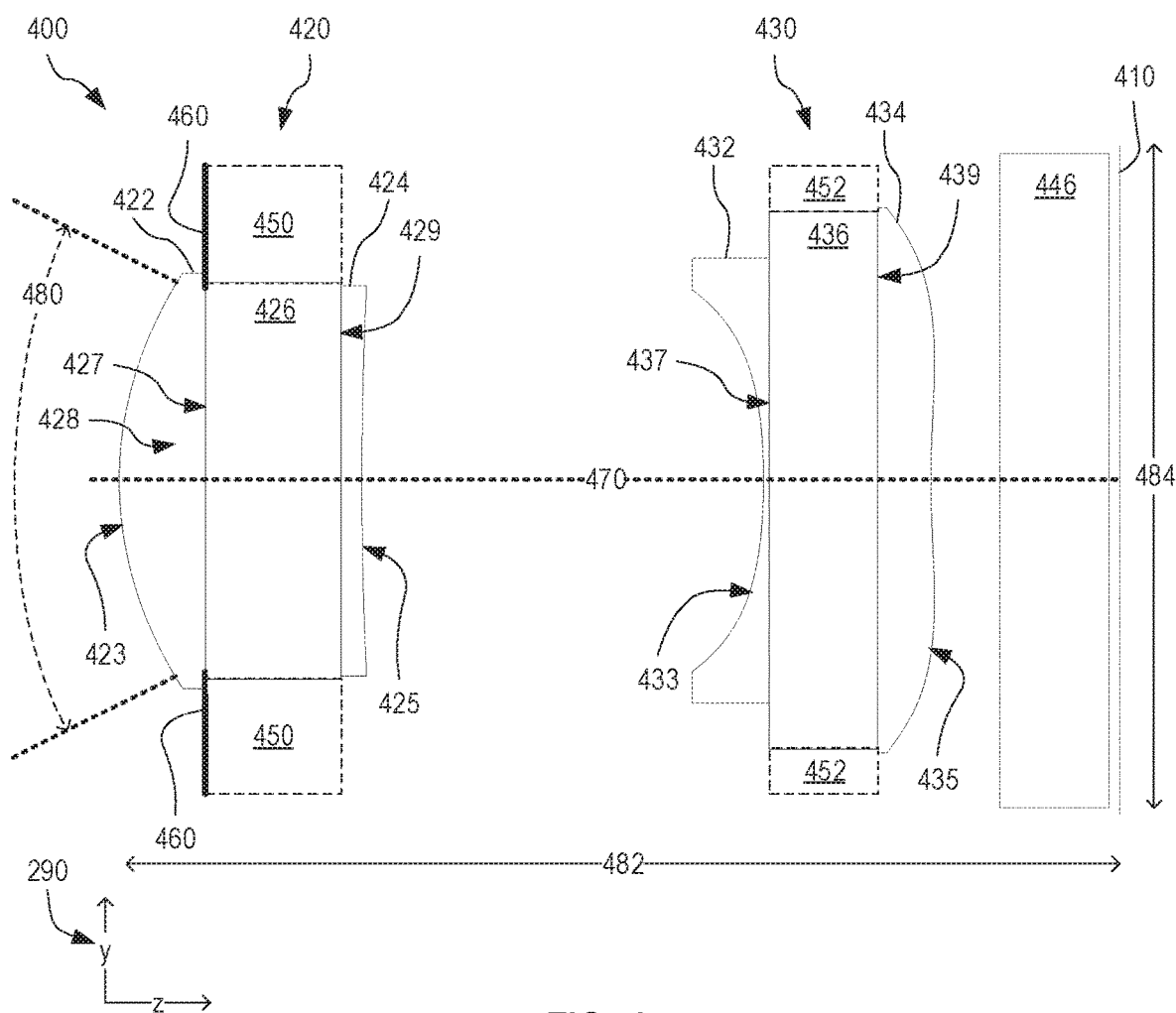
FIG. 4 illustrates one four-surface, near-infrared wafer-level lens system, according to an embodiment.

FIG. 4 illustrates one exemplary four-surface, near-infrared wafer-level lens system 400. Lens system 400 includes a first wafer-level lens 420 and a second wafer-level lens 430, optically coupled in series along an optical axis 470. Lens system 400 illustrates, by non-limiting example, the beneficial concepts of lens system 110 discussed above in connection with FIGS. 1, 2A, 2B, and 3A-C. While particular values of parameters for lens system 400 are disclosed, actual values may deviate from the disclosed values. A disclosed parameter value is a particular example of a range of values and may be extended to such a range of values. Lens system 400 is an embodiment of lens system 110. Wafer-level lenses 420 and 430 are embodiments of wafer-level lenses 120 and 130, respectively.

Lens system 400 is configured to image a scene onto an image plane 410 with a cover glass 446 placed between lens system 400 and image plane 410. Cover glass 446 is, for example, made of glass, plastic, or a combination thereof. Cover glass 446 is an embodiment of cover glass 146. Lens system 400 has a total track length (TTL) 482 and forms an image circle of diameter 484 on image plane 410. Lens system 400 has a FOV 480. FOV 480, total track length 482, and diameter 484 are examples of FOV 180, total track length 182, and diameter 184.

Wafer-level lens 420 includes a substantially planar substrate 426, a lens element 422 disposed on a substantially planar surface 427 of substrate 426, and a lens element 424 disposed on a substantially planar surface 429 of substrate 426. Surface 427 faces away from image plane 410, and surface 429 faces toward image plane 410. Lens element 422 has an aspheric convex lens surface 423 facing away from image plane 410. Lens element 424 has an aspheric concave lens surface 425 facing toward image plane 410. Substrate 426, lens element 422, lens element 424, lens surface 423, and lens surface 425 are embodiments of substrate 126, lens element 122, lens element 124, lens surface 123, and lens surface 125, respectively. Wafer-level lens 420 further includes an aperture stop 428, for example formed by an opaque coating 460 disposed on surface 427. Aperture stop 428 is an embodiment of aperture stop 128, and opaque coating 460 is an embodiment of opaque coating 129.

Wafer-level lens 430 includes a substantially planar substrate 436, a lens element 432 disposed on a substantially planar surface 437 of substrate 436, and a lens element 434 disposed on a substantially planar surface 439 of substrate 436. Surface 437 faces away from image plane 410, and surface 439 faces toward image plane 410. Lens element 432 has an aspheric concave lens surface 433 facing away from image plane 410. Lens element 434 has an aspheric lens surface 435 facing toward image plane 410. Substrate 436, lens element 432, lens element 434, lens surface 433, and lens surface 435 are embodiments of substrate 136, lens element 132, lens element 134, lens surface 133, and lens surface 135, respectively.

Each of substrates 426 and 436 may have diameter greater than that shown in FIG. 4, without departing from the scope hereof. In one such example, substrate 426 includes an additional substrate portion 450, and substrate 436 includes an additional substrate portion 452. Also in this example, the transverse extent of substrate 426 may exceed that of lens elements 422 and 424, and the transverse extent of substrate 436 may exceed that of lens elements 432 and 434. For example, lens elements 422, 424, 432, and 434 may have circular cross section, while substrates 426 and 436 may have rectangular cross section and at least in some directions away from optical axis 470 exceed the extent of lens elements 422, 424, 432, and 434.

Without departing from the scope hereof, the diameter of one or more of lens elements 422, 424, 432, and 434 may be greater than shown in FIG. 4, although the optical performance presented below assumes optically active areas as illustrated in FIG. 4.

Tables 1A and 1B list the lens data of lens system 400. The lens data includes values of design parameters for substrates 426 and 436, lens elements 422, 424, 432, and 434, lens surfaces 423, 425, 433, and 435, and aperture stop 428. The lens data also includes the configuration of cover glass (CG) 446, and a gap between cover glass 446 and image plane (IMA) 410. FOV 480 is characterized by a FOV angle of 70 degrees, and Table 1A lists an assumed object (OBJ) location and diameter according to this FOV angle of FOV 480. Lens system 400 may be implemented in camera module 102 together with a rectangular image sensor 140 that reduces FOV 480 to an operable field of view characterized by (a) a FOV angle of 62 degrees in the dimension parallel to a longer side of the rectangular image sensor and (b) a FOV angle of 36 degrees in the dimension parallel to a shorter side of the rectangular image sensor.

Material properties and thicknesses of each of substrate 426, lens element 422, lens element 424, lens element 432, substrate 436, lens element 434, and cover glass 446 are indicated in Table 1A in the same row as the first surface defining the respective element, as viewed from the scene. Material properties indicated in Table 1A are (a) the index of refraction $n_D$ at the Fraunhofer D-line $\lambda_D$=589.3, and (b) the Abbe number. The Abbe number is a measure of optical dispersion in a material and is defined as $V_d=(n_D-1)/(n_F-n_C)$, where $n_F$ and $n_C$ are the indices of refraction at the Fraunhofer F-line $\lambda_F$=486.1 nm and the Fraunhofer C-line $\lambda_C$=656.3 nm, respectively.

Table 1B lists the aspheric coefficients of each of lens surfaces 423, 425, 433, and 435. For each of these aspheric lens surfaces, the surface profile can be expressed as $$Z(s) = \frac{Cs^1}{1+\sqrt{1-(1+k)C^2s^2}} + A_4 s^4 + A_6 s^6 + \cdots,$$

where Z is the surface sag parallel to optical axis 470 as a function of the radial distance s from optical axis 470, C is the inverse of the radius of curvature, k is the conic constant, and $A_4, A_6, \ldots$ are the $4^{th}, 6^{th}, \ldots$ order aspheric terms.

Lens system 400 has a working F-number of 2.5, effective focal length EFFL of 3.682 mm, image circle diameter 484 of 2.48 mm, and TTL 482 of 3.68 mm. At this value of TTL 482, the working distance WD from lens system 400 to the associated object plane is 240.01 mm. It follows that WD/EFFL=65.2 for lens system 400.

As evident from Table 1A, lens element 422 is of a material different from that of lens element 424, and the material of lens element 432 is different from that of lens element 434. In one example, each of lens elements 422, 424, 432, and 434 is made from a polymer such as an epoxy.

Lens surface 423 has radius of curvature R1=1.352 mm and lens surface 433 has radius of curvature R3=−2.47 mm, such that the ratio R1/R3=−0.55 and the ratio R3/EFFL=−0.67.

TABLE 1A

| Surface | Radius of curvature [mm] | Thickness [mm] | $n_D$ | $V_d$ | Diameter [mm] |
|---|---|---|---|---|---|
| OBJ | Infinity | 240.01 | | | 151.60 |
| 423 | 1.352 | 0.32 | 1.52 | 49.8 | 1.54 |
| 427/STO | Infinity | 0.50 | 1.52 | 62.6 | 1.47 |
| 429 | Infinity | 0.08 | 1.51 | 57 | 1.45 |
| 425 | 15.96 | 1.47 | | | 1.44 |
| 433 | −2.47 | 0.02 | 1.59 | 31.2 | 1.42 |
| 437 | Infinity | 0.40 | 1.52 | 62.6 | 1.65 |
| 439 | Infinity | 0.20 | 1.52 | 49.8 | 2.00 |
| 435 | 2.936 | 0.25 | | | 2.03 |
| CG 446 | Infinity | 0.40 | 1.51467 | 62.6 | 2.27 |
| Gap | Infinity | 0.04 | | | 2.43 |
| IMA 410 | Infinity | | | | 2.48 |

TABLE 1B

| | Aspheric coefficient | | | | | |
|---|---|---|---|---|---|---|
| Surface | k | $A_4$ | $A_6$ | $A_8$ | $A_{10}$ | $A_{12}$ |
| 423 | −0.8526 | 0.0191 | 0.0320 | −0.0236 | −0.0624 | 0.0862 |
| 425 | 29.1297 | −0.0061 | 0.0974 | −0.3788 | 0.6118 | −0.3811 |
| 433 | −0.7788 | −0.5570 | 0.0586 | 0.8742 | −4.9623 | 4.7700 |
| 435 | −210.5487 | −0.0893 | −0.5216 | 1.0198 | −0.9653 | 0.3477 |

Figure 5:
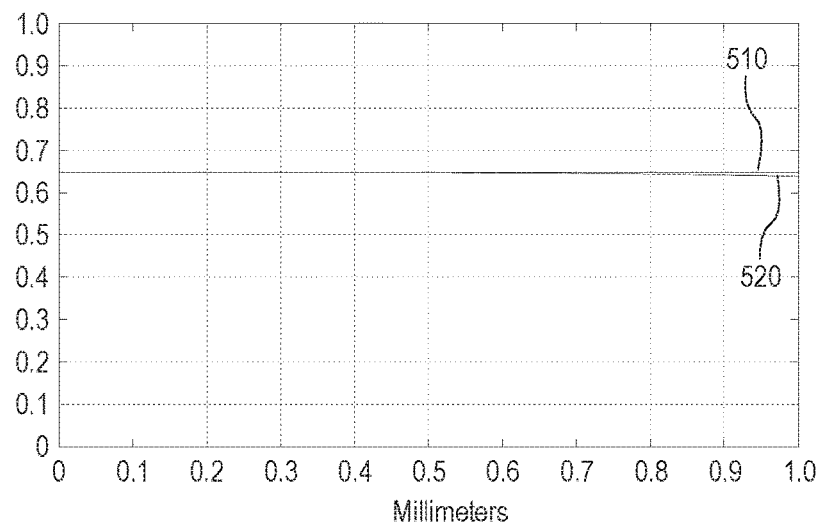
FIG. 5 shows a modulation transfer function of the lens system of FIG. 4.

FIG. 5 shows the modulation transfer function (MTF) of lens system 400 as evaluated by the Zemax® Optical Design Program over a region from optical axis 470 to a distance of 0.1 mm from optical axis 470 in image plane 410. A distance of 0.1 mm from optical axis 470 in image plane 410 corresponds to a distance of 6.3 mm from optical axis 470 in the corresponding object plane. Accordingly, the MTF data shown in FIG. 5 covers a region sufficiently large to encompass iris 194 placed on optical axis 470. The MTF plotted in FIG. 5 is evaluated at a wavelength of approximately 850 nm and a spatial resolution of 2 line pairs per millimeter in the object plane, which correspond to 127 line pairs per millimeter in image plane 410. Both sagittal rays (data 510) and tangential rays (data 520) are above an MTF value of 60%, corresponding to a contrast of at least 60% between dark and white lines, as discussed above in reference to FIGS. 3A-C. It follows that the spatial resolution of images formed by lens system 400 is sufficient for iris recognition on iris 194 placed on optical axis 470.

FIGS. 6A, 6B, 6C, and 6D show additional optical performance of lens system 400, as evaluated by the Zemax® Optical Design Program. FIGS. 6A, 6B, 6C, and 6D show spherical aberration, f-theta distortion, field curvature, and lateral color, respectively, of lens system 400, assuming locations of object (OBJ) and image plane (IMA) 410 as indicated in Table 1A. As demonstrated by FIGS. 6A, 6B, 6C, and 6D, lens system 400 produces an image on image plane 410 of high optical quality.

Figure 6A:
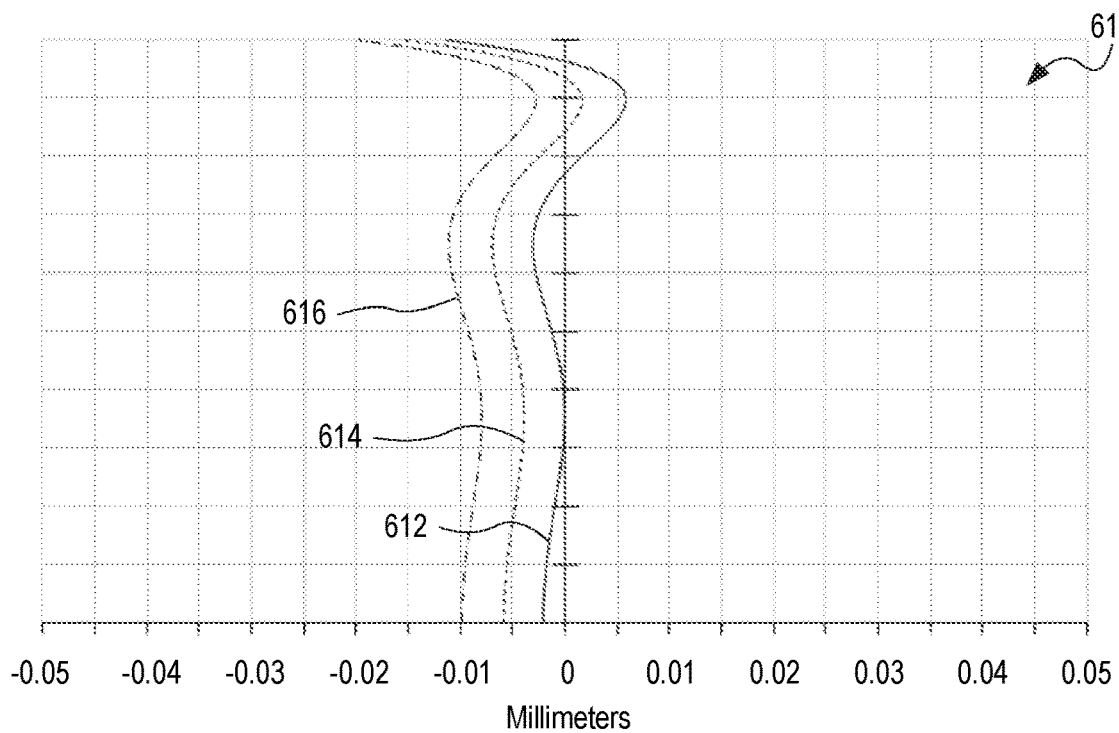
FIGS. 6A-D show additional optical performance of the lens system of FIG. 4.

FIG. 6A is a plot 610 of the longitudinal spherical aberration of lens system 400. FIG. 6A shows the longitudinal spherical aberration in millimeters, displayed on the horizontal axis, as a function of entrance pupil height, displayed on the vertical axis. The vertical axis extends from optical axis 470 to the most extreme radial distance from optical axis 470 associated with FOV 480. The maximum entrance pupil radius is $r_p$=0.7991 mm. Longitudinal spherical aberration curves 612 (solid line), 614 (dashed line), and 616 (dash-dot line) are computed at 875 nm, 850 nm, and 825 nm, respectively.

Figure 6B:
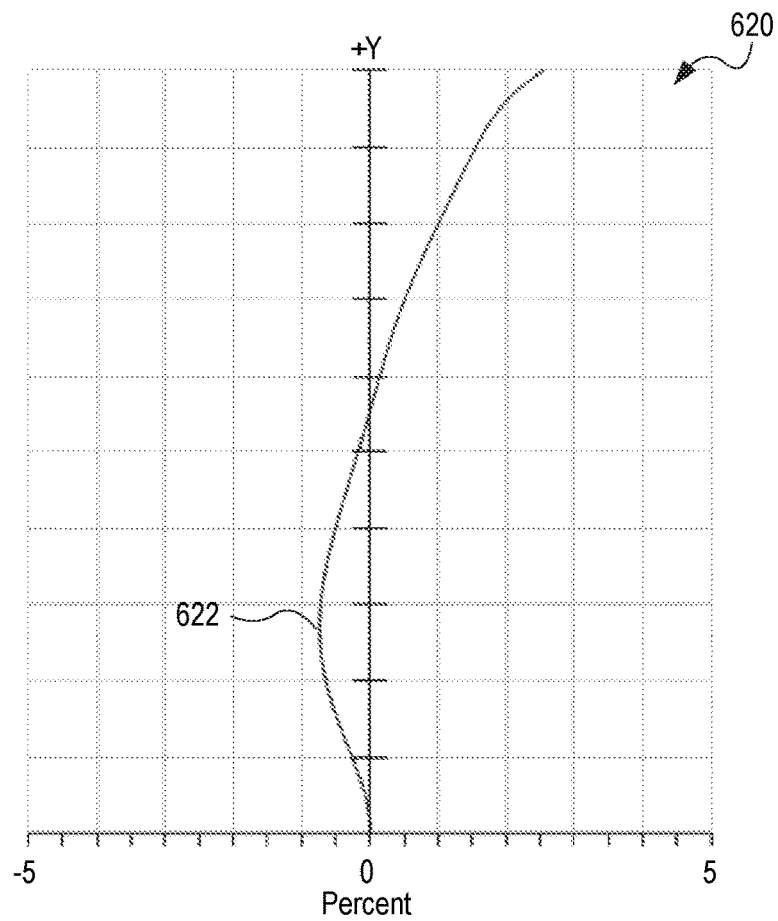

FIG. 6B is a plot 620 of the f-theta distortion of lens system 400. FIG. 6B shows the f-theta distortion in percent, displayed on the horizontal axis, as a function of field angle, displayed on the vertical axis. The vertical axis extends from optical axis 470 to field angle of 17.512°, corresponding to the limit of an operable field of view in one implementation wherein lens system 400 is coupled with a rectangular image sensor 140 having a shorter side that limits the corresponding operable field of view to 35 degrees. The distortion is the same at each of wavelengths 875 nm, 850 nm, and 825 nm, and is indicated by distortion curve 622.

Figure 6C:
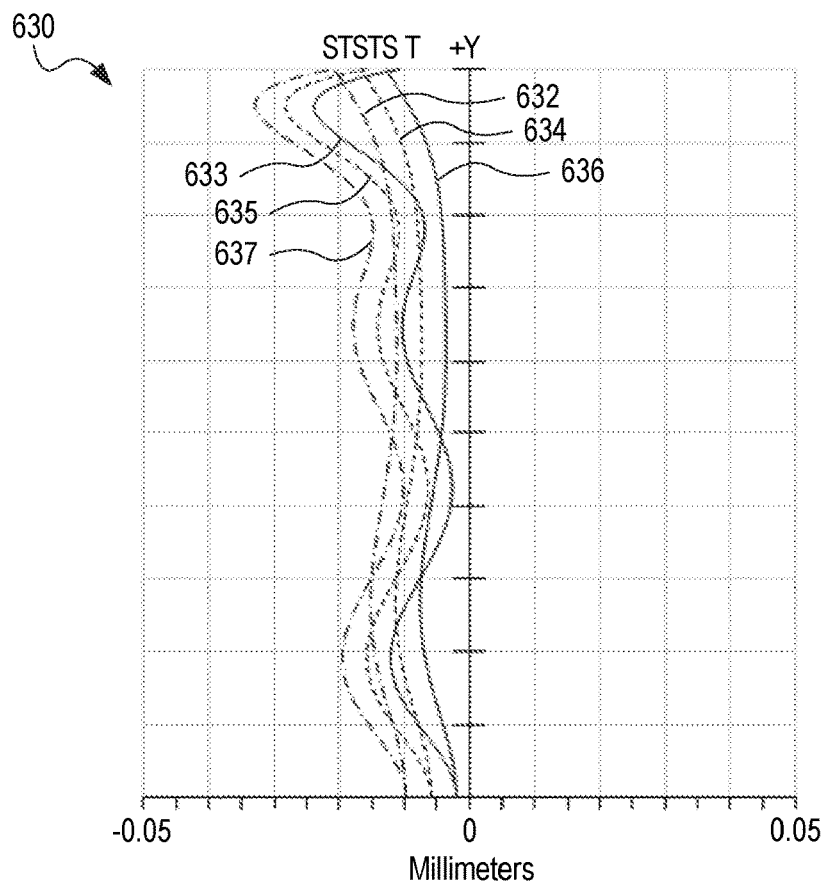

FIG. 6C is a plot 630 of the Petzval field curvature of lens system 400. The field curvature is plotted in millimeters, displayed on the horizontal axis, for field angles between zero and 17.512°, displayed on the vertical axis. Field curvature 632 and field curvature 633 are computed at 875 nm in the sagittal (S) and tangential (T) planes, respectively. Field curvature 634 and field curvature 635 are computed at 850 nm in the sagittal (S) and tangential (T) planes, respectively. Field curvature 636 and field curvature 637 are computed at 825 nm in the sagittal (S) and tangential (T) planes, respectively.

Figure 6D:
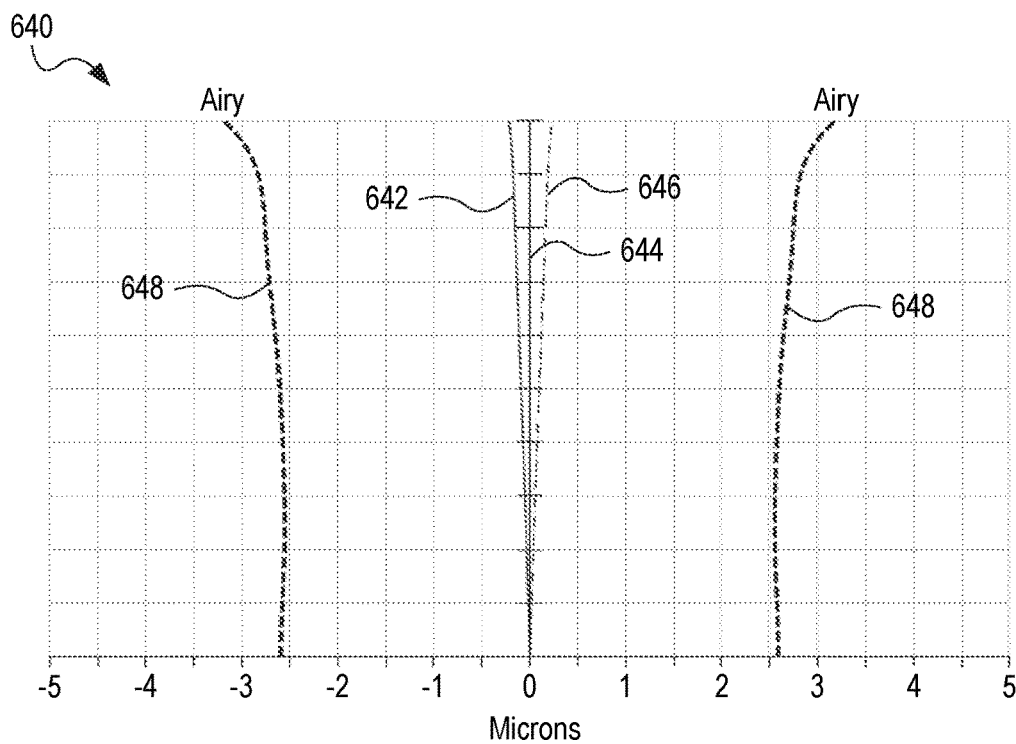

FIG. 6D is a plot 640 of the lateral color error, also known as transverse chromatic aberration, for lens system 400. FIG. 6D shows the lateral color error in microns, displayed on the horizontal axis, as a function of field height, displayed on the vertical axis. The vertical axis extends from optical axis 470 to the most extreme radial distance from optical axis 470 associated with IC diameter 484. The field height ranges from $h_{min}$=0 (on-axis) to $h_{max}$=1.2340 mm. Lateral color is referenced to 850 nm, such that the lateral color 644 for 850 nm is zero for all field heights. Lateral color 642 is computed at 875 nm. Lateral color 646 is computed at 825 nm. For comparison, FIG. 6D also indicates the Airy disk 648. Both lateral color 642 and lateral color 646 are well within Airy disk 648.

Figure 7:
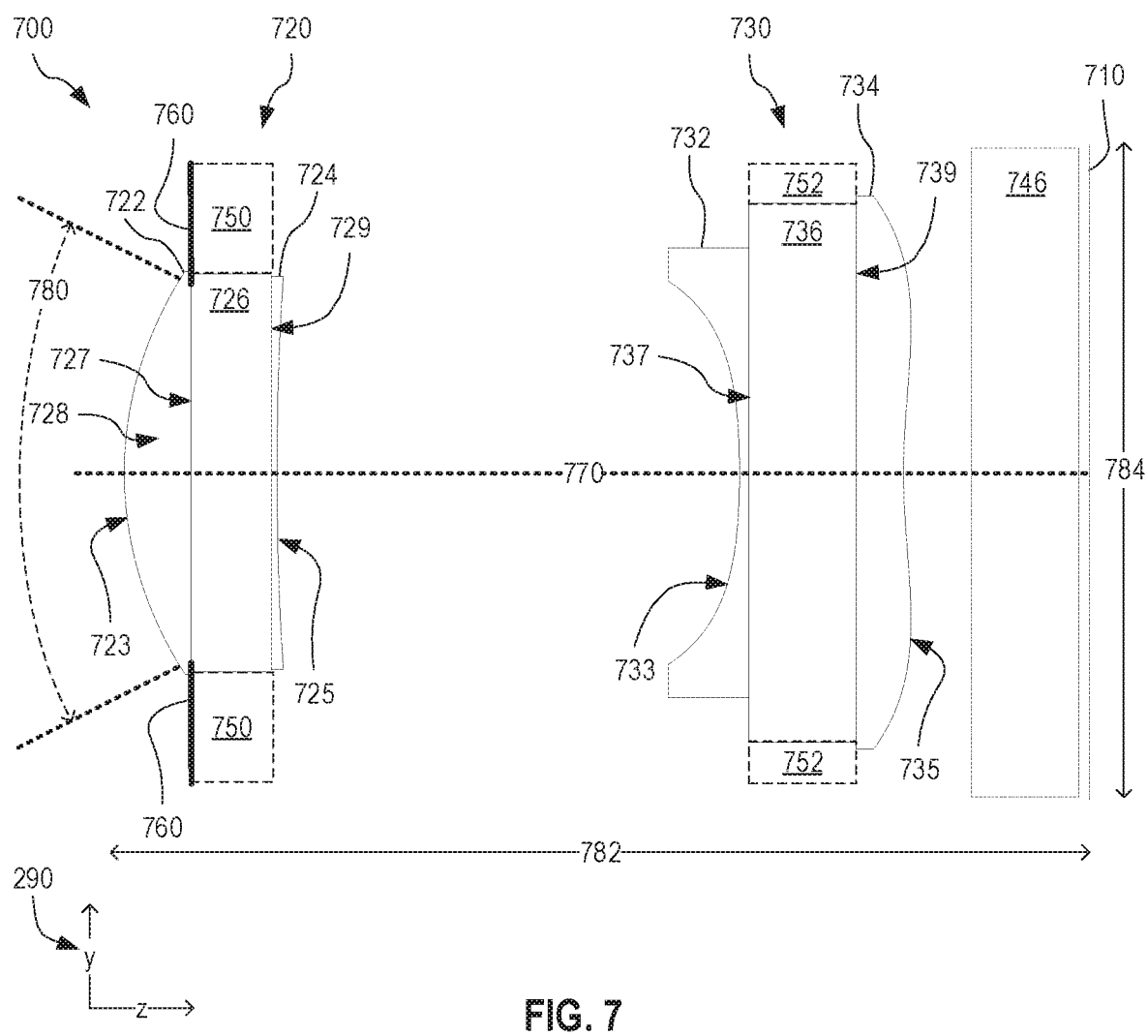
FIG. 7 illustrates another four-surface, near-infrared wafer-level lens system, according to an embodiment.

FIG. 7 illustrates another exemplary four-surface, near-infrared wafer-level lens system 700. Lens system 700 includes a first wafer-level lens 720 and a second wafer-level lens 730, optically coupled in series along an optical axis 770. Lens system 700 illustrates, by non-limiting example, the beneficial concepts of lens system 110 discussed above in connection with FIGS. 1, 2A, 2B, and 3A-C. While particular values of parameters for lens system 700 are disclosed, actual values may deviate from the disclosed values. A disclosed parameter value is a particular example of a range of values and may be extended to such a range of values. Lens system 700 is an embodiment of lens system 110. Wafer-level lenses 720 and 730 are embodiments of wafer-level lenses 120 and 130, respectively.

Lens system 700 is configured to image a scene onto an image plane 710 with a cover glass 746 placed between lens system 700 and image plane 710. Cover glass 746 is, for example, made of glass, plastic, or a combination thereof. Cover glass 746 is an embodiment of cover glass 146. Lens system 700 has a total track length (TTL) 782 and forms an image circle of diameter 784 on image plane 710. Lens system 700 has a FOV 780. FOV 780, total track length 782, and diameter 784 are examples of FOV 180, total track length 182, and diameter 184.

Wafer-level lens 720 includes a substantially planar substrate 726, a lens element 722 disposed on a substantially planar surface 727 of substrate 726, and a lens element 724 disposed on a substantially planar surface 729 of substrate 726. Surface 727 faces away from image plane 710, and surface 729 faces toward image plane 710. Lens element 722 has an aspheric convex lens surface 723 facing away from image plane 710. Lens element 724 has an aspheric concave lens surface 725 facing toward image plane 710. Substrate 726, lens element 722, lens element 724, lens surface 723, and lens surface 725 are embodiments of substrate 126, lens element 122, lens element 124, lens surface 123, and lens surface 125, respectively. Wafer-level lens 720 further includes an aperture stop 728, for example formed by an opaque coating 760 disposed on surface 727. Aperture stop 728 is an embodiment of aperture stop 128, and opaque coating 760 is an embodiment of opaque coating 129.

Wafer-level lens 730 includes a substantially planar substrate 736, a lens element 732 disposed on a substantially planar surface 737 of substrate 736, and a lens element 734 disposed on a substantially planar surface 739 of substrate 736. Surface 737 faces away from image plane 710, and surface 739 faces toward image plane 710. Lens element 732 has an aspheric concave lens surface 733 facing away from image plane 710. Lens element 734 has an aspheric lens surface 735 facing toward image plane 710. Substrate 736, lens element 732, lens element 734, lens surface 733, and lens surface 735 are embodiments of substrate 136, lens element 132, lens element 134, lens surface 133, and lens surface 135, respectively.

Each of substrates 726 and 736 may have diameter greater than that shown in FIG. 7, without departing from the scope hereof. In one such example, substrate 726 includes an additional substrate portion 750, and substrate 736 includes an additional substrate portion 752. Also in this example, the transverse extent of substrate 726 may exceed that of lens elements 722 and 724, and the transverse extent of substrate 736 may exceed that of lens elements 732 and 734. For example, lens elements 722, 724, 732, and 734 may have circular cross section, while substrates 726 and 736 may have rectangular cross section and at least in some directions away from optical axis 770 exceed the extent of lens elements 722, 724, 732, and 734.

Without departing from the scope hereof, the diameter of one or more of lens elements 722, 724, 732, and 734 may be greater than shown in FIG. 7, although the optical performance presented below assumes optically active areas as illustrated in FIG. 7.

Tables 2A and 2B list the lens data of lens system 700. The lens data includes values of design parameters for substrates 726 and 736, lens elements 722, 724, 732, and 734, lens surfaces 723, 725, 733, and 735, and aperture stop 728. The lens data also includes the configuration of cover glass (CG) 746, and a gap between cover glass 746 and image plane (IMA) 710. FOV 780 is characterized by a FOV angle of 70 degrees, and Table 2A lists an assumed object (OBJ) location and diameter according to this FOV angle of FOV 780. Lens system 700 may be implemented in camera module 102 together with a rectangular image sensor 140 that reduces FOV 780 to an operable field of view characterized by (a) a FOV angle of 62 degrees in the dimension parallel to a longer side of the rectangular image sensor and (b) a FOV angle of 36.2 degrees in the dimension parallel to a shorter side of the rectangular image sensor.

Material properties and thicknesses of each of substrate 726, lens element 722, lens element 724, lens element 732, substrate 736, lens element 734, and cover glass 746 are indicated in Table 2A in the same row as the first surface defining the respective element, as viewed from the scene. Material properties indicated in Table 2A are (a) the index of refraction $n_D$ at the Fraunhofer D-line $\lambda_D$=589.3, and (b) the Abbe number.

Table 2B lists the aspheric coefficients of each of lens surfaces 723, 725, 733, and 735. For each of these aspheric lens surfaces, the surface profile can be expressed as $$Z(s) = \frac{Cs^1}{1 + \sqrt{1 - (1+k)C^2 s^2}} + A_4 s^4 + A_6 s^6 + \cdots,$$

where Z is the surface sag parallel to optical axis 770 as a function of the radial distance s from optical axis 770, C is the inverse of the radius of curvature, k is the conic constant, and $A_4$, $A_6$, ... are the $4^{th}$, $6^{th}$, ... order aspheric terms.

Lens system 700 has a working F-number of 2.5, effective focal length EFFL of 3.681 mm, image circle diameter 784 of 2.47 mm, and TTL 782 of 3.61 mm. At this value of TTL 782, the working distance WD from lens system 700 to the associated object plane is 240.01 mm. It follows that WD/EFFL=65.2 for lens system 700.

As evident from Table 2A, lens element 722 is of a material different from that of lens element 724, and the material of lens element 732 is different from that of lens element 734. In one example, each of lens elements 722, 724, 732, and 734 is made from a polymer such as an epoxy.

Lens surface 723 has radius of curvature R1=1.351 mm and lens surface 733 has radius of curvature R3=−3.07 mm, such that the ratio R1/R3=−0.44 and the ratio R3/EFFL=−0.83.

TABLE 2A

| Surface | Radius of curvature [mm] | Thickness [mm] | $n_D$ | $V_d$ | Diameter [mm] |
| --- | --- | --- | --- | --- | --- |
| OBJ | Infinity | 240.01 | | | 151.98 |
| 723 | 1.351 | 0.25 | 1.52 | 49.8 | 1.52 |
| 727/STO | Infinity | 0.30 | 1.52 | 62.6 | 1.48 |
| 729 | Infinity | 0.02 | 1.51 | 57 | 1.48 |
| 725 | 13.19 | 1.73 | | | 1.48 |
| 733 | −3.07 | 0.04 | 1.52 | 49.8 | 1.44 |
| 737 | Infinity | 0.40 | 1.52 | 62.6 | 1.70 |
| 739 | Infinity | 0.18 | 1.52 | 49.8 | 2.08 |
| 735 | 2.221 | 0.25 | | | 2.08 |
| CG 746 | Infinity | 0.40 | 1.51467 | 62.6 | 2.29 |
| Gap | Infinity | 0.04 | | | 2.44 |
| IMA 710 | Infinity | | | | 2.47 |

TABLE 2B

| | Aspheric coefficient | | | | | |
|---|---|---|---|---|---|---|
| Surface | k | $A_4$ | $A_6$ | $A_8$ | $A_{10}$ | $A_{12}$ |
| 723 | −0.9123 | 0.0063 | 0.2148 | −0.6643 | 0.9505 | −0.5014 |
| 725 | −2084906 | −0.0014 | 0.2102 | −0.7901 | 1.2983 | −0.7901 |
| 733 | 11.0358 | −0.5172 | 0.2910 | −1.0227 | 1.0006 | −1.0735 |
| 735 | −77.8019 | −0.0802 | −0.2701 | 0.3644 | −0.2675 | 0.0810 |

Figure 8:
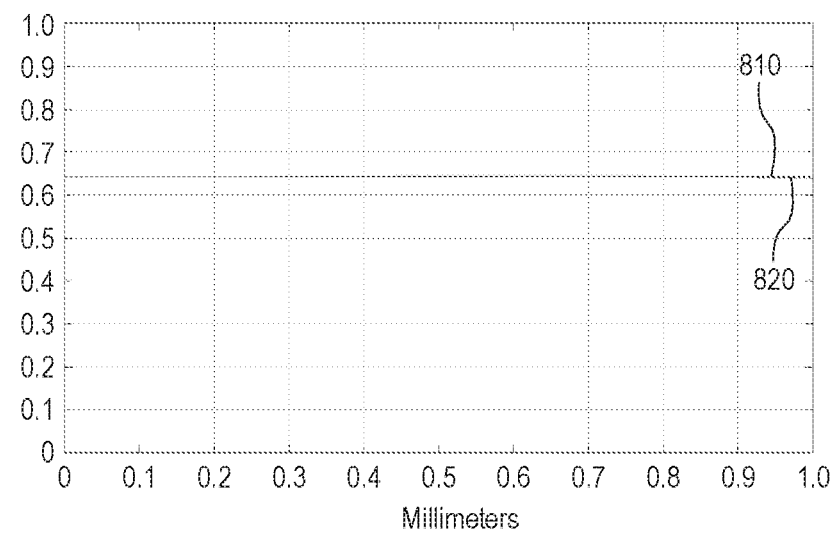
FIG. 8 shows a modulation transfer function of the lens system of FIG.

FIG. 8 shows the modulation transfer function (MTF) of lens system 700 as evaluated by the Zemax® Optical Design Program over a region from optical axis 770 to a distance of 0.1 mm from optical axis 770 in image plane 710. A distance of 0.1 mm from optical axis 770 in image plane 710 corresponds to a distance of 6.3 mm from optical axis 770 in the corresponding object plane. Accordingly, the MTF data shown in FIG. 8 covers a region sufficiently large to encompass iris 194 placed on optical axis 770. The MTF plotted in FIG. 8 is evaluated at a wavelength of approximately 850 nm and a spatial resolution of 2 line pairs per millimeter in the object plane, which corresponds to 127 line pairs per millimeter in image plane 710. Both sagittal rays (data 810) and tangential rays (data 820) are above an MTF value of 60%, corresponding to a contrast of at least 60% between dark and white lines, as discussed above in reference to FIGS. 3A-C. It follows that the spatial resolution of images formed by lens system 700 is sufficient for iris recognition on iris 194 placed on optical axis 770.

FIGS. 9A, 9B, 9C, and 9D show additional optical performance of lens system 700, as evaluated by the Zemax® Optical Design Program. FIGS. 9A, 9B, 9C, and 9D show spherical aberration, f-theta distortion, field curvature, and lateral color, respectively, of lens system 700, assuming locations of object (OBJ) and image plane (IMA) 710 as indicated in Table 2A. As demonstrated by FIGS. 9A, 9B, 9C, and 9D, lens system 700 produces an image on image plane 710 of high optical quality.

Figure 9A:
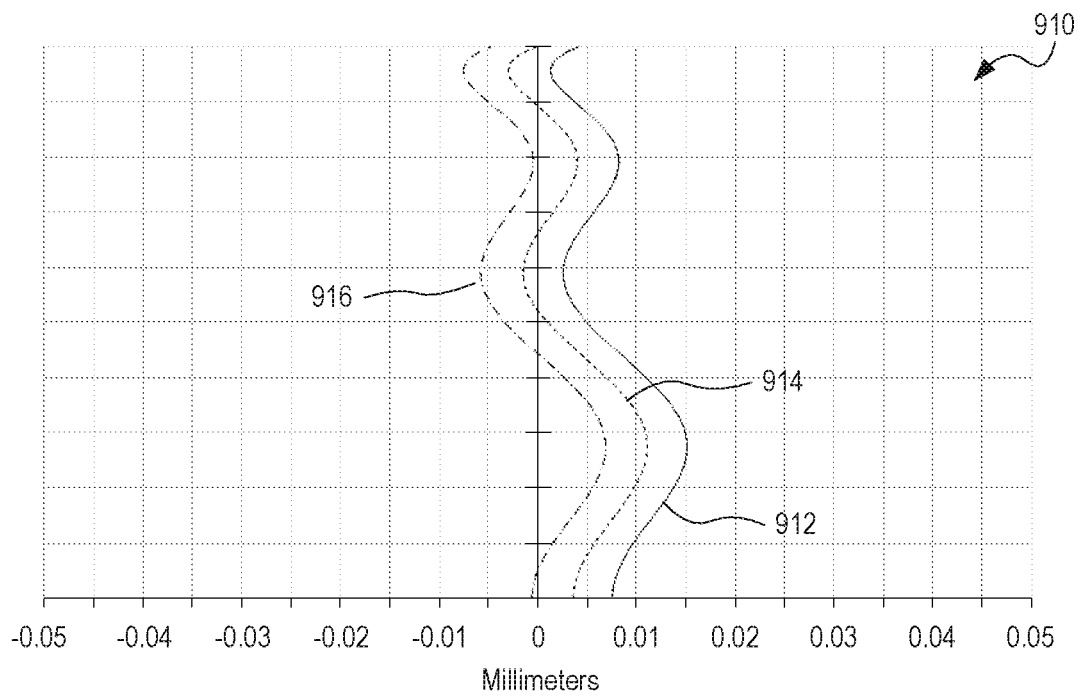
FIGS. 9A-D show additional optical performance of the lens system of FIG. 7.

FIG. 9A is a plot 910 of the longitudinal spherical aberration of lens system 700. FIG. 9A shows the longitudinal spherical aberration in millimeters, displayed on the horizontal axis, as a function of entrance pupil height, displayed on the vertical axis. The vertical axis extends from optical axis 770 to the most extreme radial distance from optical axis 770 associated with FOV 780. The maximum entrance pupil radius is $r_p$=0.7992 mm. Longitudinal spherical aberration curves 912 (solid line), 914 (dashed line), and 916 (dash-dot line) are computed at 875 nm, 850 nm, and 825 nm, respectively.

Figure 9B:
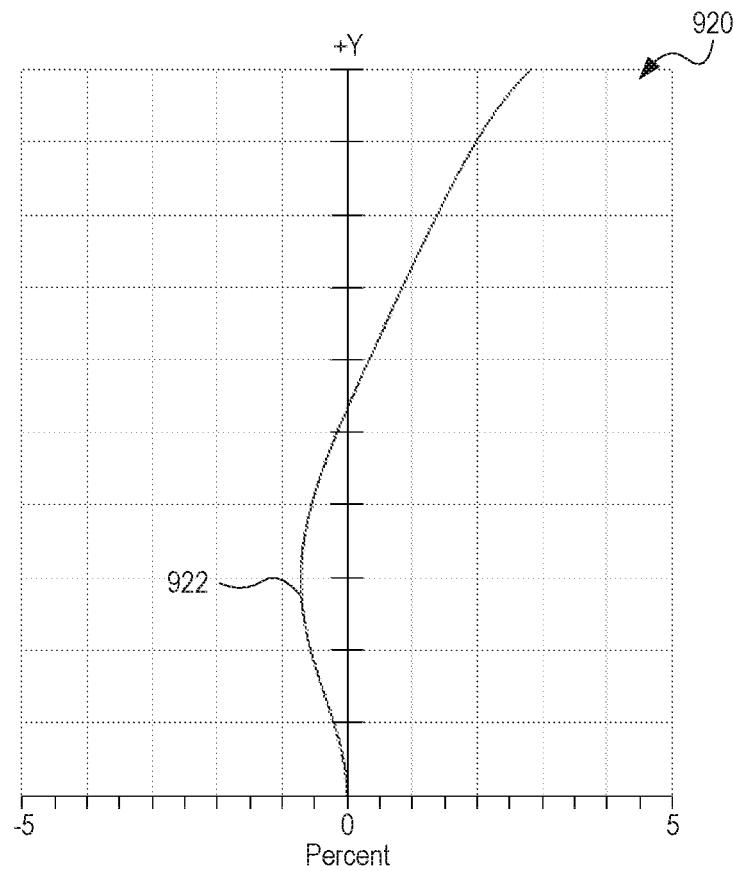

FIG. 9B is a plot 920 of the f-theta distortion of lens system 700. FIG. 9B shows the f-theta distortion in percent, displayed on the horizontal axis, as a function of field angle, displayed on the vertical axis. The vertical axis extends from optical axis 770 to field angle of 17.556°, corresponding to the limit of an operable field of view in one implementation wherein lens system 700 is coupled with a rectangular image sensor 140 having a shorter side that limits the corresponding operable field of view to 35.1 degrees. The distortion is the same at each of wavelengths 875 nm, 850 nm, and 825 nm, and is indicated by distortion curve 922.

Figure 9C:
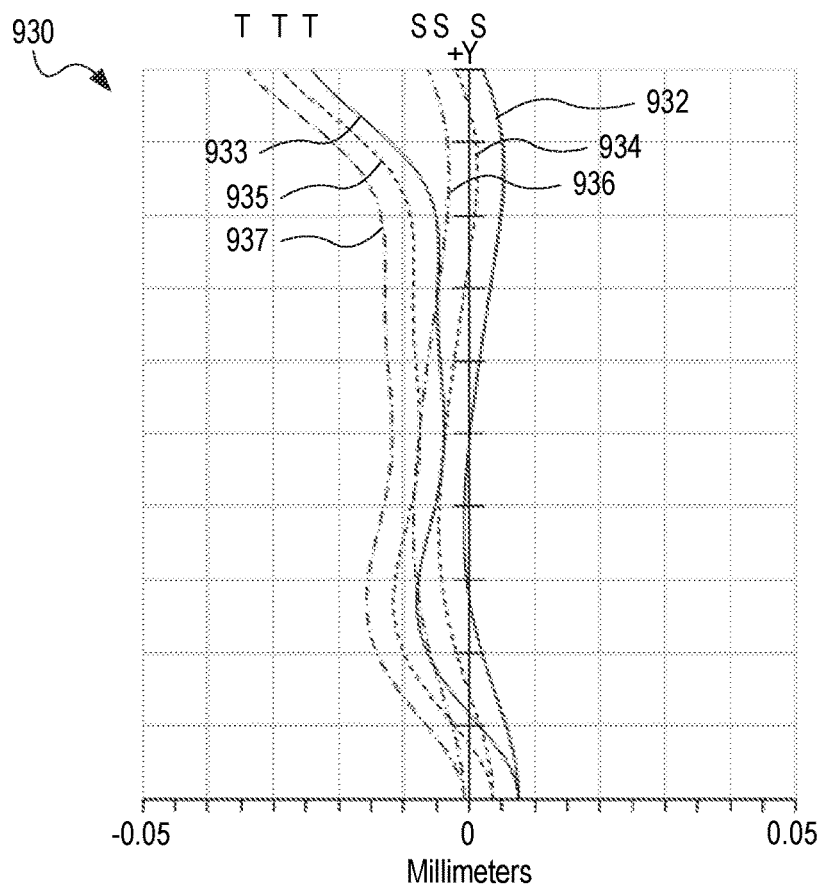

FIG. 9C is a plot 930 of the Petzval field curvature of lens system 700. The field curvature is plotted in millimeters, displayed on the horizontal axis, for field angles between zero and 17.556°, displayed on the vertical axis. Field curvature 932 and field curvature 933 are computed at 875 nm in the sagittal (S) and tangential (T) planes, respectively. Field curvature 934 and field curvature 935 are computed at 850 nm in the sagittal (S) and tangential (T) planes, respectively. Field curvature 936 and field curvature 937 are computed at 825 nm in the sagittal (S) and tangential (T) planes, respectively.

Figure 9D:
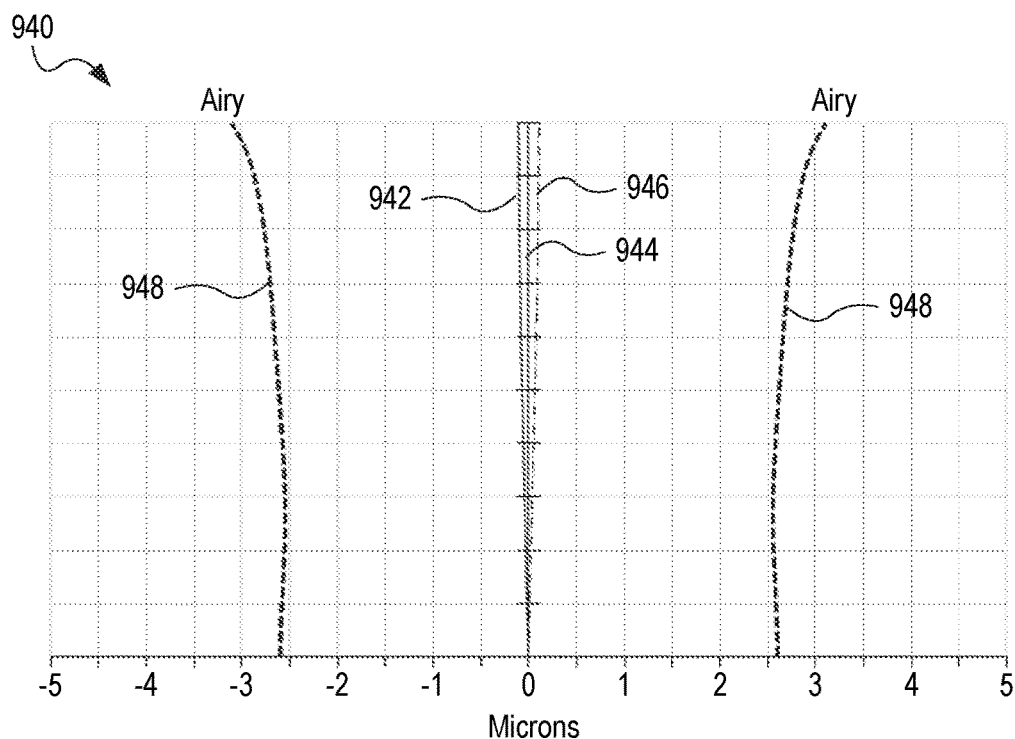

FIG. 9D is a plot 940 of the lateral color error, also known as transverse chromatic aberration, for lens system 700. FIG. 9D shows the lateral color error in microns, displayed on the horizontal axis, as a function of field height, displayed on the vertical axis. The vertical axis extends from optical axis 770 to the most extreme radial distance from optical axis 770 associated with IC diameter 784. The field height ranges from $h_{min}$=0 (on-axis) to $h_{max}$=1.2340 mm. Lateral color is referenced to 850 nm, such that the lateral color 944 for 850 nm is zero for all field heights. Lateral color 942 is computed at 875 nm. Lateral color 946 is computed at 825 nm. For comparison, FIG. 9D also indicates the Airy disk 948. Both lateral color 942 and lateral color 946 are well within Airy disk 948.

Figure 10:
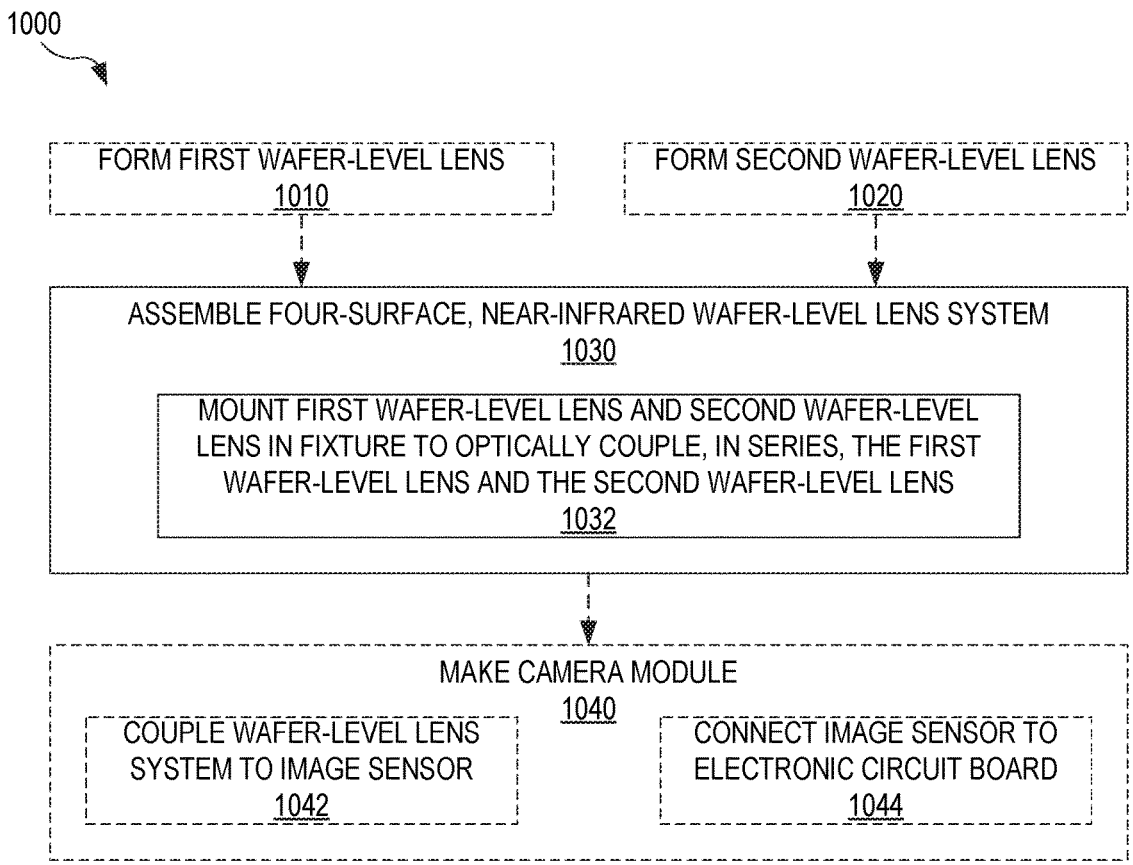
FIG. 10 illustrates a method for manufacturing a four-surface, near-infrared wafer-level lens system, according to an embodiment.

FIG. 10 illustrates one exemplary method 1000 for manufacturing lens system 110. Method 1000 may be used to form lens system 110 according to the lens specification of lens system 400 or according to the lens specification of lens system 700.

In a step 1030, method 1000 assembles lens system 110. Step 1030 includes a step 1032, wherein wafer-level lenses 120 and 130 are mounted in a fixture to optically couple wafer-level lenses 120 and 130 in series. In one example, step 1032 utilizes methods known in the art to mount wafer-level lenses 120 and 130 in a fixture.

Optionally, step 1030 is preceded by steps 1010 and 1020 of forming wafer-level lenses 120 and 130, respectively, using wafer-level lens manufacturing technology.

In an embodiment, method 1000 further includes a step 1040 of making camera module 102 based upon lens system 110 as assembled in step 1030. Step 1040 includes a step 1042 of coupling lens system 110 to image sensor 140 to form camera module 102. In one example of step 1042, the fixture of step 1032 is mounted onto image sensor 140. Optionally, step 1040 further includes a step 1044 of connecting image sensor 140 to an electronic circuit board. In one example of step 1044, lens system 110 is electrically connected to an electronic circuit board.

Figure 11:
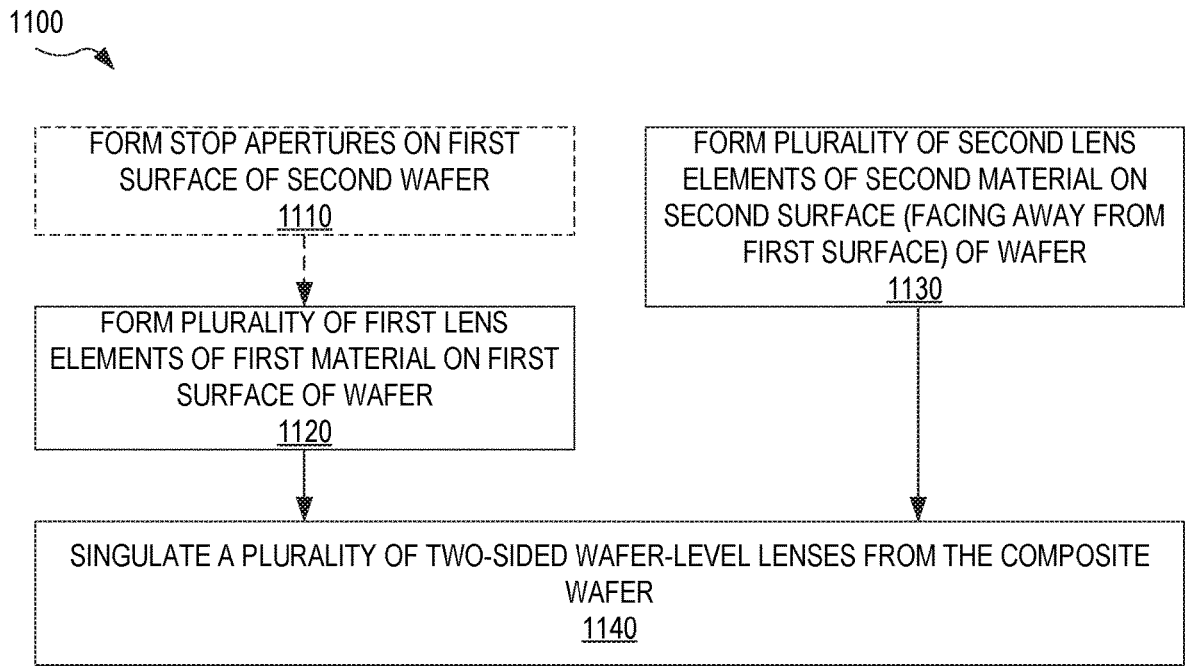
FIG. 11 illustrates a method for forming wafer-level lenses of a four-surface, near-infrared wafer-level lens system, according to an embodiment.

FIG. 11 illustrates one exemplary method 1100 for forming either one of wafer-level lenses 120 and 130. Each of steps 1010 and 1020 of method 1000 may implement method 1100.

In a step 1120, a plurality of lens elements of a first material are formed on a first surface of a wafer. In one embodiment of step 1120, a plurality of lens elements 122 are molded on the first surface of a wafer made of the material associated with substrate 126. For example, a resin (such as a polymer resin) is deposited onto the first surface of the wafer, a mold with a plurality of recesses, each of shape complimentary to lens surface 123, is placed on the first surface (with the resin), the resin is cured, and the mold is removed from the first surface. The resin may be an ultraviolet (UV) curable epoxy that is cured by shining UV light through the wafer to the resin on the first surface. In another embodiment, a plurality of lens elements 132 are molded on the first surface of a wafer made of the material associated with substrate 136. For example, a resin (such as a polymer resin) is deposited onto the first surface of the wafer, a mold with a plurality of recesses, each of shape complimentary to lens surface 133, is placed on the first surface (with the resin), the resin is cured, and the mold is removed from the first surface. The resin may be an ultraviolet (UV) curable epoxy that is cured by shining UV light through the wafer to the resin on the first surface.

When used to form wafer-level lenses 120, method 1100 further includes a step 1110 prior to step 1120. In step 1110, a plurality of aperture stops are formed on the first surface of the wafer. The aperture stops are respectively aligned with the positions of the lens elements formed in subsequent step 1120. In one example of step 1110, coating 129 is applied to the first surface of the wafer to form a plurality of aperture stops 128.

In a step 1130, a plurality of lens elements of a second material are formed on a second surface of the wafer, facing away from the first surface. Step 1130 may utilize the same method as step 1120. In one embodiment of step 1130, a plurality of lens elements 124 are formed on a wafer made of the material associated with substrate 126. In another embodiment of step 1130, a plurality of lens elements 134 are formed on a wafer made of the material associated with substrate 136. The first material may be different from the second material.

In a step 1140, a plurality of wafer-level lenses are singulated from the wafer formed in steps 1120 and 1130. The wafer is diced, for example using methods known in the art, to form the plurality of wafer-level lenses. In one example of step 1140, the wafer is singulated to form a plurality of wafer-level lenses 120. In another example of step 1140, the wafer is singulated to form a plurality of wafer-level lenses 130.

Without departing from the scope hereof, step 1130 may be performed after step 1120, before step 1120, before step 1110, or between steps 1110 and 1120.

Combinations of Features

Features described above as well as those claimed below may be combined in various ways without departing from the scope hereof. For example, it will be appreciated that aspects of one four-surface, near-infrared wafer-level lens system, or associated method of manufacture, described herein may incorporate or swap features of another four-surface, near-infrared wafer-level lens system, or associated method of manufacture, described herein. The following examples illustrate some possible, non-limiting combinations of embodiments described above. It should be clear that many other changes and modifications may be made to the systems and methods herein without departing from the spirit and scope of this invention:

(A1) A four-surface, near-infrared wafer-level lens system for imaging a scene onto an image plane may include (a) a first wafer-level lens having a first convex lens surface facing the scene and a second concave lens surface facing the image plane, and (b) a second wafer-level lens disposed between the first wafer-level lens and the image plane and including a third concave lens surface facing the scene and a fourth aspheric convex lens surface facing the image plane.

(A2) The lens system denoted as (A1) may be further characterized by an image resolution, in the image plane, corresponding to at least 60% contrast of 2 line pairs per millimeter in object plane across a scene portion having at least 10 millimeters extent in the object plane.

(A3) In the lens system denoted as (A2), the scene portion may be centered on optical axis of the four-surface, near-infrared wafer-level lens system.

(A4) Either or both of the lens systems denoted as (A2) and (A3) may be configured to achieve the 60% contrast in wavelength range from 825 to 875 nanometers.

(A5) Any of the four lens systems denoted as (A2) through (A4) may be configured to achieve the 60% contrast at least for a 240 millimeter distance between the object plane and the first convex lens surface.

(A6) Any of the lens systems denoted as (A2) through (A5) may have magnification such that 2 line pairs per millimeter in the object plane correspond to between 120 and 140 line pairs per millimeter in the image plane.

(A7) Any of the lens systems denoted as (A1) through (A6) may have effective focal length (EFFL) such that, at least for a 240 millimeter working distance (WD), WD/EFFL<66.

(A8) In any of the lens systems denoted as (A1) through (A7), the first convex lens surface may have radius of curvature R1, the third concave lens surface may have radius of curvature R3, the absolute value of R1/R3 may be greater than 0.43, and the effective focal length (EFFL) of the lens system may be such that the absolute value of R3/EFFL is less than 0.84.

(A9) In any of the lens systems denoted as (A1) through (A8), the first wafer-level lens may include a first planar substrate, a first lens element bonded to a first side of the first planar substrate facing the scene, the first lens element forming the first convex lens surface, and a second lens element bonded to a second side of the first planar substrate facing the image plane, the second lens element forming the second concave lens surface, and the second wafer-level lens may include a second planar substrate, a third lens element bonded to a first side of the first planar substrate facing the scene, the third lens element forming the third concave lens surface, and a fourth lens element bonded to a second side of the first planar substrate facing the image plane, the fourth lens element forming the fourth aspheric lens surface.

(A10) In the lens system denoted as (A9), the Abbe number of the second lens element may be greater than the Abbe number of the first lens element.

(A11) In either or both of the lens systems denoted as (A9) and (A10), the first lens element, the third lens element, and the fourth lens element may be of same material.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A four-surface, near-infrared wafer-level lens system for imaging a scene onto an image plane, comprising:
   a first wafer-level lens having a first convex lens surface facing the scene and a second concave lens surface facing the image plane; and
   a second wafer-level lens disposed between the first wafer-level lens and the image plane and including a third concave lens surface facing the scene and a fourth aspheric lens surface facing the image plane;

wherein the four-surface, near-infrared wafer-level lens system has (a) a field of view (FOV) characterized by a transverse extent relative to an optical axis of the four-surface, near-infrared wafer-level lens system, the transverse extent being in a range between 100 and 200 millimeters for working distances in a range between 180 and 300 millimeters, and (b) effective focal length (EFFL) such that, for a working distance (WD) of 240 millimeters, WD/EFFL<66.

2. The four-surface, near-infrared wafer-level lens system of claim 1, the scene being centered on the optical axis.

3. The four-surface, near-infrared wafer-level lens system of claim 1, the first convex lens surface having radius of curvature R1, the third concave lens surface having radius of curvature R3, absolute value of R1/R3 being greater than 0.43, and effective focal length (EFFL) of the four-surface, near-infrared wafer-level lens system is such that the absolute value of R3/EFFL is less than 0.84.

4. A four-surface, near-infrared wafer-level lens system for imaging a scene onto an image plane, comprising:
    a first wafer-level lens having a first convex lens surface facing the scene and a second concave lens surface facing the image plane, the first wafer-level lens comprising:
        a first planar substrate,
        a first lens element bonded to a first side of the first planar substrate facing the scene, the first lens element forming the first convex lens surface, and
        a second lens element bonded to a second side of the first planar substrate facing the image plane, the second lens element forming the second concave lens surface; and
    a second wafer-level lens disposed between the first wafer-level lens and the image plane and including a third concave lens surface facing the scene and a fourth aspheric lens surface facing the image plane, the second wafer-level lens comprising:
        a second planar substrate,
        a third lens element bonded to a first side of the second planar substrate facing the scene, the third lens element forming the third concave lens surface, and
        a fourth lens element bonded to a second side of the second planar substrate facing the image plane, the fourth lens element forming the fourth aspheric lens surface;
    wherein (a) the four-surface, near-infrared wafer-level lens system has a field of view (FOV) characterized by a transverse extent relative to an optical axis of the four-surface, near-infrared wafer-level lens system, the transverse extent being in the range between 100 and 200 millimeters for working distances (WDs) in the range between 180 and 300 millimeters, (b) Abbe number of the second lens element is greater than Abbe number of the first lens element, and (c) the first lens element, the third lens element, and the fourth lens element are of same material.

5. A four-surface, near-infrared wafer-level lens system for imaging a scene onto an image plane, comprising:
    a first wafer-level lens having a first convex lens surface facing the scene and a second concave lens surface facing the image plane; and
    a second wafer-level lens disposed between the first wafer-level lens and the image plane and including a third concave lens surface facing the scene and a fourth aspheric lens surface facing the image plane;
    wherein, for a working distance (WD) of 240 millimeters, effective focal length (EFFL) of the four-surface, near-infrared wafer-level lens system fulfills WD/EFFL<75.

6. The four-surface, near-infrared wafer-level lens system of claim 5, being configured to operate in wavelength range from 825 to 875 nanometers.

7. The four-surface, near-infrared wafer-level lens system of claim 5, the first convex lens surface having radius of curvature R1, the third concave lens surface having radius of curvature R3, absolute value of R1/R3 being greater than 0.43, and effective focal length (EFFL) of the four-surface, near-infrared wafer-level lens system is such that the absolute value of R3/EFFL is less than 0.84.

8. The four-surface, near-infrared wafer-level lens system of claim 5,
    the first wafer-level lens comprising:
        a first planar substrate,
        a first lens element bonded to a first side of the first planar substrate facing the scene, the first lens element forming the first convex lens surface, and
        a second lens element bonded to a second side of the first planar substrate facing the image plane, the second lens element forming the second concave lens surface; and
    the second wafer-level lens comprising:
        a second planar substrate,
        a third lens element bonded to a first side of the second planar substrate facing the scene, the third lens element forming the third concave lens surface, and
        a fourth lens element bonded to a second side of the second planar substrate facing the image plane, the fourth lens element forming the fourth aspheric lens surface.

9. The four-surface, near-infrared wafer-level lens system of claim 8, Abbe number of the second lens element being greater than Abbe number of the first lens element.

10. The four-surface, near-infrared wafer-level lens system of claim 9, the first lens element, the third lens element, and the fourth lens element being of same material.

* * * * *